(12) United States Patent
Wang et al.

(10) Patent No.: US 6,714,585 B1
(45) Date of Patent: Mar. 30, 2004

(54) RAKE COMBINING METHODS AND APPARATUS USING WEIGHTING FACTORS DERIVED FROM KNOWLEDGE OF SPREADING SPECTRUM SIGNAL CHARACTERISTICS

(75) Inventors: Yi-Pin Eric Wang, Cary, NC (US); Tony Ottosson, Morrisville, NC (US); Gregory Edward Bottomley, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/344,899

(22) Filed: Jun. 25, 1999

(51) Int. Cl.$^7$ ................................................ H04B 1/707
(52) U.S. Cl. ...................................................... 375/148
(58) Field of Search ................................. 375/140, 142, 375/143, 144, 148, 150, 152, 347

(56) References Cited

U.S. PATENT DOCUMENTS

| | | | |
|---|---|---|---|
| 5,572,552 A | 11/1996 | Dent et al. | 375/343 |
| 5,574,747 A | 11/1996 | Lomp | 375/200 |
| 5,615,209 A | 3/1997 | Bottomley | 370/342 |
| 5,673,291 A | 9/1997 | Dent | 375/262 |
| 5,809,020 A | 9/1998 | Bruckert et al. | 370/335 |
| 5,812,542 A | 9/1998 | Bruckert et al. | 370/335 |
| 6,157,687 A | 12/2000 | Ono | 375/347 |
| 6,192,066 B1 * | 2/2001 | Asanuma | 375/130 |
| 6,208,683 B1 * | 3/2001 | Mizuguchi et al. | 375/140 |
| 6,301,293 B1 | 10/2001 | Huang et al. | 375/206 |
| 6,370,183 B1 * | 4/2002 | Newson et al. | 375/144 |

FOREIGN PATENT DOCUMENTS

| | | | |
|---|---|---|---|
| DE | 3507841 | 3/1985 | H04R/3/04 |
| EP | 0 825 727 A1 | 2/1998 | |
| EP | 0 893 888 A2 | 1/1999 | |
| EP | 0 898 383 A2 | 2/1999 | |
| GB | 2320404 | 6/1998 | H04N/5/455 |

OTHER PUBLICATIONS

German Search Report dated Jun. 18, 1999.

Adachi et al., "Wideband DS–CDMA for Next–Generation Mobile Communications Systems," IEEE Communications Magazine, Sep., 1998, pp. 56–69.

Barbosa et al., "Adaptive Detection of DS/CDMA Signals in Fading Channels," IEEE Trans. Commun., vol. 46, pp. 115–124, Jan. 1998.

(List continued on next page.)

*Primary Examiner*—Stephen Chin
*Assistant Examiner*—Kevin Kim
(74) *Attorney, Agent, or Firm*—Myers Bigel Sibley & Sajovec

(57) ABSTRACT

Information encoded in a transmitted spread spectrum signal included in a composite signal is recovered. The composite signal is received from the communications medium, and correlated with a desired spreading sequence to produce a plurality of time-offset correlations. Weighting factors are generated based on knowledge of spread spectrum signals in the composite signal. The correlations are combined according to the weighting factors to estimate information encoded in the transmitted spread spectrum signal. According to one aspect, a composite channel response is estimated from knowledge of the desired spreading sequence and an impairment correlation is determined from an estimate of power of an interfering spread spectrum signal and an estimate of power of noise in the composite signal. The composite channel response and impairment correlation are used to generate the weighting factors. According to another aspect, weighting factors are iteratively generated from an estimated channel response, an estimated impairment correlation, and previously determined weighting factors. Related apparatus are also described.

45 Claims, 10 Drawing Sheets

OTHER PUBLICATIONS

Bottomley et al., "Adaptive Arrays and MLSE Equalization," Proc. 1995 IEEE 45$^{th}$ Vehicular Technology Conference (VTC '95), Chicago, Jul. 25–28, 1995, 5 pgs.

Dahlman et al., "UMTS/IMT–2000 Based on Wideband CDMA," IEEE Communications Magazine, Sep. 1998, pp. 70–80.

Dent et al., "CDMA–IC: A Novel Code Division Multiple Access Scheme Based on Interference Cancellation," in Proc. PIMRC, Boston, Massachusetts, pp. 4.1.1–4.1.5, Oct. 1992.

Dinan et al., "Spreading Codes for Direct Sequence CDMA and Wideband CDMA Cellular Networks," IEEE Communications Magazine, Sep. 1998, pp. 48–54.

Duel–Hallen et al., "Multiuser Detection of CDMA Systems," IEEE Personal Commun. Mag., vol. 2, pp. 46–58, Apr. 1995.

Ewerbring et al., "CDMA with Interference Cancellation: A Technique for High Capacity Wireless Systems," in Proc. IEEE Int. Conf. Commun., Geneva, Switzerland, 1993.

Gumas, "A Century Old, the Fast Hadamard Transform Proves Useful in Digital Communications," Personal Engineering, Nov. 1997, pp. 57–63.

Hottinen et al., "Multi–User Detection for Multi–Rate CDMA Communications," in Proc. IEEE Int. Conf. Commun., Dallas, Texas, Jun. 24–28, 1996.

Juntti, M.J., "Multi–User Detector Performance Comparisons in Multi–Rate CDMA Systems," in Proc. IEEE VTC '98, pp. 31–35, Ottawa, Canada, May 1998.

Juntti, M.J., "System Concept Comparisons for Multi–Rate CDMA with Multi–User Detection," in Proc. IEEE VTC '98, pp. 36–40, Ottawa, Canada, May 1998.

Kohno et al., "Combination of an Adaptive Array Antenna and a Canceller of Interference for Direct–Sequence Spread–Spectrum Multiple–Access System," IEEE Journal on Selected Areas in Communication, vol. 8, No. 4, May 1990.

Liu et al., "Blind Equalization in Antenna Array CDMA Systems," IEEE Trans. Sig. Proc., vol. 45, pp. 161–172, Jan. 1997.

Madhow et al., "MMSE Interference Suppression for Direct–Sequence Spread–Spectrum Communication," IEEE Trans. Commun., vol. 42, pp. 3178–3188, Dec. 1994.

Madkour et al., "Multi–Rate Multi–Code CDMA Using FWT For Mobile and Personal Communications," in Proceedings of The Ninth IEEE International Symposium on Personal, Indoor and Mobile Radio Communications, The Marriott Copley Place, Boston, Massachusetts, Sep. 8–11, 1998.

Mailaender et al., "Linear Single–User Detectors for Asynchronous and Quasi–Synchronous CDMA," in Proc. 29$^{th}$ Annual Conf. on Info. Sciences and Systems (CISS '95), Johns Hopkins University, pp. 199–204, 1995.

Muszynski, P., "Interference Rejection Rake–Combining for WCDMA," First Intl. Symposium on Wireless Personal Multimedia Communications (WPMC '98), Yokosuka, Japan, pp. 93–98, Nov. 4–6, 1998.

Naguib et al., "Performance of CDMA Cellular Networks with Base–Station Antenna Arrays," Presented at the 1994 International Zurich Seminar on Digital Communications (no date).

Ng et al., "A Structured Channel Estimator for Maximum–Likelihood Sequence Detection," IEEE Commun. Letters, vol. 1, pp. 52–55, Mar. 1997.

Ojanpera et al., "Qualitative Comparison of Some Multi–User Detector Algorithms for Wideband CDMA," in Proc. IEEE VTC '98, pp. 46–50, Ottawa, Canada, May 1998.

Patel et al., "Analysis of a DS/CDMA Successive Interference Cancellation Scheme in DS/CDMA System Using Correlations," in Proc. GLOBECOM, Houston, Texas, pp. 76–80, 1993.

Patel et al., "Analysis of a Simple Successive Interference Cancellation Scheme in DS/CDMA System," IEEE JSAC, vol. 12, No. 5, pp. 796–807, Jun. 1994.

Pateros et al., "An Adaptive Correlator Receiver for Direct–Sequence–Spread–Spectrum Communication," IEEE Trans. Commun., vol. 44, pp. 1543–1552, Nov. 1996.

Peterson et al., "Introduction to Spread–Spectrum Communications," Prentice Hall International, Inc., pp. 540–547, 1995.

Picinbono, B., "On Circularity," IEEE Trans. Sig. Proc., vol. 42, pp. 3473–3482, Dec. 1994.

Picinbono, B., "Second–Order Complex Random Vectors and Normal Distributions," IEEE Trans. Sig. Proc., vol. 44, pp. 2637–2640, Oct. 1996.

Wang et al., "Blind Multi–User Detection: A Subspace Approach," IEEE Trans. Info. Theory, vol. 44, No. 2, pp. 677–690, Mar. 1998.

Yoon et al., "A Spread–Spectrum Multiaccess System with Cochannel Interference Cancellation for Multipath Fading Channels," IEEE J. Select. Areas Commun., vol. 11, No. 7, pp. 1067–1075, Sep. 1993.

Yoon et al., "Matched Filtering in Improper Complex Noise and Applications to DS–CMDA," Sixth IEEE Intl. Symp. Personal, Indoor, Mobile Radio Commun. (PIMRC '95), Toronto, Sep. 27–29, 1995.

Yoon et al., "Matched Filters with Interference Suppression Capabilities for DS–CDMA," IEEE J. Sel. Areas Commun., vol. 14, pp. 1510–5121, Oct. 1996.

Yoon et al., "Maximizing SNR in Improper Complex Noise and Applications to CDMA," IEEE Commun. Letters, vol. 1, pp. 5–8, Jan. 1997.

Zvonar et al., "Sub–Optimal Multi–User Detector for Frequency Selective Rayleigh Fading Synchronous CDMA Channels," IEEE Trans. Commun., vol. 43, No. 2/3/4, pp. 154–157, Feb./Mar./Apr. 1995.

U.S. patent application Ser. No. 09/165,647, Bottomley, filed Oct. 2, 1998.

Monk et al., "A Noise Whitening Approach to Multiple Access Noise Rejection–Part I: Theory and Background," *IEEE Journal on Selected Areas in Communications*, vol. 12, Jun. 1994, pp. 817–827.

Monk et al., "A Noise Whitening Approach to Multiple–Access Noise Rejection–Part II: Implementation Issues," *IEEE Journal on Selected Areas in Communications*, vol. 14, Oct. 1996, pp. 1488–1499.

Klein, Data Detection Algorithms Specifically Designed for the Downlink of CDMA Mobile Radio Systems, *1997 IEEE Vehicular Technology Conference*, Phoenix, AZ, May 4–7, 1997.

Bottomley, "Optimizing the Rake Receiver for Demodulation of Downlink CDMA Signals," *Proceedings of the 43$^{rd}$ IEEE Vehicular Technology Conference*, Secaucus, NJ, May 18–20, 1993.

Jamal et al., "Adaptive MLSE Performance on the D–AMPS 1900 Channel," *IEEE Transactions on Vehicular Technology*, vol. 46, Aug. 1997, pp. 634–641.

Harris et al. "Handbook of Mathematics and Computer Science," published by Springer–Verlag, New York, 1998, pp. 456–457.

International Search Report, PCT/US00/12757, Sep. 4, 2000.

International Search Report, PCT/US00/12670, Jan. 9, 2000.

* cited by examiner

RAKE COMBINING METHODS AND APPARATUS USING WEIGHTING FACTORS DERIVED FROM KNOWLEDGE OF SPREADING SPECTRUM SIGNAL CHARACTERISTICS

CROSS-REFERENCE TO RELATED APPLICATION

This application is related to application Ser. No. 09/344,898, filed concurrently herewith, entitled Multi-Stage Rake Combining Methods and Apparatus, to Bottomley et al., assigned to the assignee of the present application. The disclosure of this application is hereby incorporated herein by reference.

FIELD OF THE INVENTION

The present invention relates to communications methods and apparatus, and more particularly, to spread spectrum communications methods and apparatus.

BACKGROUND OF THE INVENTION

Wireless communications systems are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

FIG. 1 illustrates a typical terrestrial cellular radiotelephone communication system 20. The cellular radiotelephone system 20 may include one or more radiotelephones (terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 will have allocated to it one or more dedicated control channels and one or more traffic channels. A control channel is a dedicated channel used for transmitting cell identification and paging information. The traffic channels carry the voice and data information. Through the cellular network 20, a duplex radio communication link may be effected between two mobile terminals 22 or between a mobile terminal 22 and a landline telephone user 32 through a public switched telephone network (PSTN) 34. The function of a base station 26 is to handle radio communication between a cell 24 and mobile terminals 22. In this capacity, a base station 26 functions as a relay station for data and voice signals.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to a public switched telephone network 34, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Several types of access techniques are conventionally used to provide wireless services to users of wireless systems such as those illustrated in FIGS. 1 and 2. Traditional analog cellular systems generally employ a system referred to as frequency division multiple access (FDMA) to create communications channels, wherein discrete frequency bands serve as channels over which cellular terminals communicate with cellular base stations. Typically, these bands are reused in geographically separated cells in order to increase system capacity.

Modern digital wireless systems typically utilize different multiple access techniques such as time division multiple access (TDMA) and/or code division multiple access (CDMA) to provide increased spectral efficiency. In TDMA systems, such as those conforming to the GSM or IS-136 standards, carriers are divided into sequential time slots that are assigned to multiple channels such that a plurality of channels may be multiplexed on a single carrier. CDMA systems, such as those conforming to the IS-95 standard, achieve increased channel capacity by using "spread spectrum" techniques wherein a channel is defined by modulating a data-modulated carrier signal by a unique spreading code, i.e., a code that spreads an original data-modulated carrier over a wide portion of the frequency spectrum in which the communications system operates.

Conventional spread-spectrum CDMA communications systems commonly use so-called "direct sequence" spread spectrum modulation. In direct sequence modulation, a data-modulated carrier is directly modulated by a spreading code or sequence before being amplified by a power amplifier and transmitted over a communications medium, e.g., an air interface. The spreading code typically includes a sequence of "chips" occurring at a chip rate that typically is much higher than the bit rate of the data being transmitted.

Typical transmit operations of such a system are illustrated in FIG. 3. Data streams from different users are subjected to various signal processing steps, such as error correction coding or interleaving, and spread using a combination of a user specific spreading code and a group-specific scrambling code. The coded data streams from the users are then combined, subjected to carrier modulation and transmitted as a composite signal in a communications medium.

A so-called Rake receiver structure is commonly used to recover information corresponding to one of the user data streams. In a typical Rake receiver, a received composite signal is typically correlated with a particular spreading sequence assigned to the receiver to produce a plurality of time-offset correlations, a respective one of which corresponds to an echo of a transmitted spread spectrum signal. The correlations are then combined in a weighted fashion, i.e., respective correlations are multiplied by respective weighting factors and then summed to produce a decision statistic.

Several approaches to determining appropriate weighting factors have been proposed. Classical optimal Rake receivers typically are designed with an underlying assumption of uncorrelated noise at the receiver, and thus typically use the complex conjugates of channel coefficients estimated by a channel estimator as weighting factors. Such an approach may yield less than desirable results in CDMA systems, because the passing of interfering signals through the dispersive medium generally introduces correlation into the noise at the receiver. Accordingly, receiver approaches have been proposed based on a model of "colored" noise, as described, for example, in "A Noise Whitening Approach to Multiple Access Noise Rejection-Part I: Theory and Background," by Monk et al., *IEEE Journal on Selected Areas in Communications*, vol. 12, pp., 817–827(June 1994); "A Noise Whitening Approach to Multiple Access Noise Rejection-Part II: Implementation Issues," by Monk et al., *IEEE Journal on Selected Areas in Communications*, vol. 14, pp. 1488–1499 (October 1996); "Data Detection Algorithms Specifically Designed for the Downlink of CDMA Mobile Radio Systems," by Klein, 1997 IEEE Vehicular Technology Conference, Phoenix Ariz. (May 4–7, 1997); U.S. Pat. No. 5,572,552 to Dent et al. (issued Nov. 5, 1996); and "Optimizing the Rake Receiver for Demodulation of Downlink CDMA Signals," by Bottomley, *Proceedings of the 43$^{rd}$ IEEE Vehicular Technology Conference*, Secaucus N.J. (May 18–20, 1993).

Although such approaches can be effective in improving reception of spread-spectrum signals, there is an ongoing need for improved techniques for processing received spread spectrum signals that account for interference from other spread spectrum signals.

SUMMARY OF THE INVENTION

In light of the foregoing, it is an object of the present invention to provide improved methods and apparatus for recovering information represented by a spread spectrum signal transmitted in a communications medium.

It is another object of the present invention to provide improved methods and apparatus for recovering information represented by a spread spectrum signal that can compensate for interference from other spread spectrum signals transmitted in the communications medium.

These and other objects, features and advantages can be provided, according to the present invention, by methods and apparatus in which correlations of a received composite signal with a desired spreading sequence are weightedly combined using weighting factors that are generated based on knowledge of the spread spectrum signals present in the composite signal, including pulse shape information, e.g., based on the statistical properties of the desired sequence and power of the interfering spread spectrum signals using other sequences. More particularly, the weighting factors may be generated from a composite channel response estimated using the statistical properties of the desired sequence and an impairment correlation determined from a power estimate of at least one other spread spectrum signal and noise present in the composite signal. According to an aspect of the present invention, updated weighting factors are iteratively estimated from previously computed weighting factors, obviating the need to perform inversion of an impairment correlation matrix.

In particular, according to the present invention, information encoded in a first spread spectrum signal transmitted according to a first spreading sequence in a communications medium is recovered. A composite signal including the first spread spectrum signal is received from the communications medium. The composite signal is correlated with the first spreading sequence to produce a plurality of time-offset correlations of the composite signal with the first spreading sequence. Weighting factors are generated based on knowledge of spread spectrum signals present in the composite signal, including pulse shaping information. The correlations are combined according to the weighting factors to estimate information encoded in the transmitted first spread spectrum signal.

According to one embodiment of the present invention, a composite channel response is estimated from knowledge of the first spreading sequence. An impairment correlation is estimated from knowledge of the first spreading sequence, an estimate of power of a second spread spectrum signal in the composite signal, and an estimate of power of noise in the composite signal. Weighting factors are then generated from the estimated composite channel response and the estimated impairment correlation.

According to another embodiment of the present invention, a multiuser interference correlation and a noise correlation are estimated. The estimated multiuser interference correlation and the estimated noise correlation are then summed to estimate the impairment correlation. An intersymbol interference correlation may also be estimated, and added to the estimated multiuser interference correlation and the estimated noise correlation to estimate the impairment correlation.

According to another aspect of the present invention, weighting factors are iteratively generated from an estimated channel response, an estimated impairment correlation, and previously determined weighting factors. A composite signal including a first spread spectrum signal is received from the communications medium. The composite signal is correlated with the first spreading sequence to produce a plurality of time-offset correlations of the composite signal with the first spreading sequence. The correlations are combined according to the iteratively generated weighting factors to estimate information encoded in the transmitted first spread spectrum signal. The channel response may be a composite channel response estimated from knowledge of the first spreading sequence, and the impairment correlation may be estimated from knowledge of the first spreading sequence, an estimate of power of a second spread spectrum signal in the composite signal, and an estimate of power of noise in the composite signal.

According to another aspect of the present invention, an apparatus for recovering information encoded in a first spread spectrum signal transmitted in a communications medium includes means for receiving a composite signal including the first spread spectrum signal from the communications medium. Means are provided, responsive to the means for receiving, for correlating the composite signal with the first spreading sequence to produce a plurality of time-offset correlations of the composite signal with the first spreading sequence. Means are provided for generating weighting factors based on knowledge of spread spectrum signals in the composite signal, including pulse shaping information. Means are also provided, responsive to the means for correlating and to the means for generating weighting factors, for combining the correlations according to the weighting factors to estimate information encoded in the transmitted first spread spectrum signal.

According to another aspect of the present invention, an apparatus for recovering information encoded in a first spread spectrum signal includes means for iteratively generating weighting factors from an estimated channel response, an estimated impairment correlation, and previously determined weighting factors. Means are provided for receiving a composite signal including the first spread spectrum signal from the communications medium. Means are also provided, responsive to the means for receiving, for correlating the composite signal with the first spreading sequence to produce a plurality of time-offset correlations of the composite signal with the first spreading sequence. Means are also provided, responsive to the means for generating a second set of weighting factors and to the means for correlating, for combining the correlations according to the iteratively generated weighting factors to estimate information encoded in the transmitted first spread spectrum signal.

According to yet another aspect of the present invention, an apparatus for recovering information encoded in a first spread spectrum signal encoded according to a first spreading sequence includes a correlation unit operative to correlate a composite signal with the first spreading sequence to produce a plurality of time-offset correlations of the composite signal with the first spreading sequence. A weighting factor generator is operative to generate weighting factors based on knowledge of spread spectrum signals in the composite signal, including pulse shaping information. A weighted combiner is responsive to the correlation unit and to the weighting factor generator and operative to combine the correlations according to the weighting factors to produce a decision statistic. A detector is responsive to the weighted combiner and operative to generate an estimate of information encoded in the transmitted first spread spectrum signal from the decision statistic.

According to an embodiment of the present invention, the weighting factor generator includes a composite channel response calculator operative to calculate a composite channel response from estimated channel coefficients and knowledge of the first spreading sequence. An impairment correlation calculator is operative to calculate an impairment correlation from estimated channel coefficients, knowledge of the first spreading sequence, an estimate of power of a second spread spectrum signal in the composite signal and an estimate of power of noise in the composite signal. A weighting factor calculator is responsive to the composite channel response calculator and to the impairment correlation calculator to calculate weighting factors from the calculated composite channel response and the calculated impairment correlation.

DETAILED DESCRIPTION OF PREFERRED EMBODIMENTS

Figure 1:
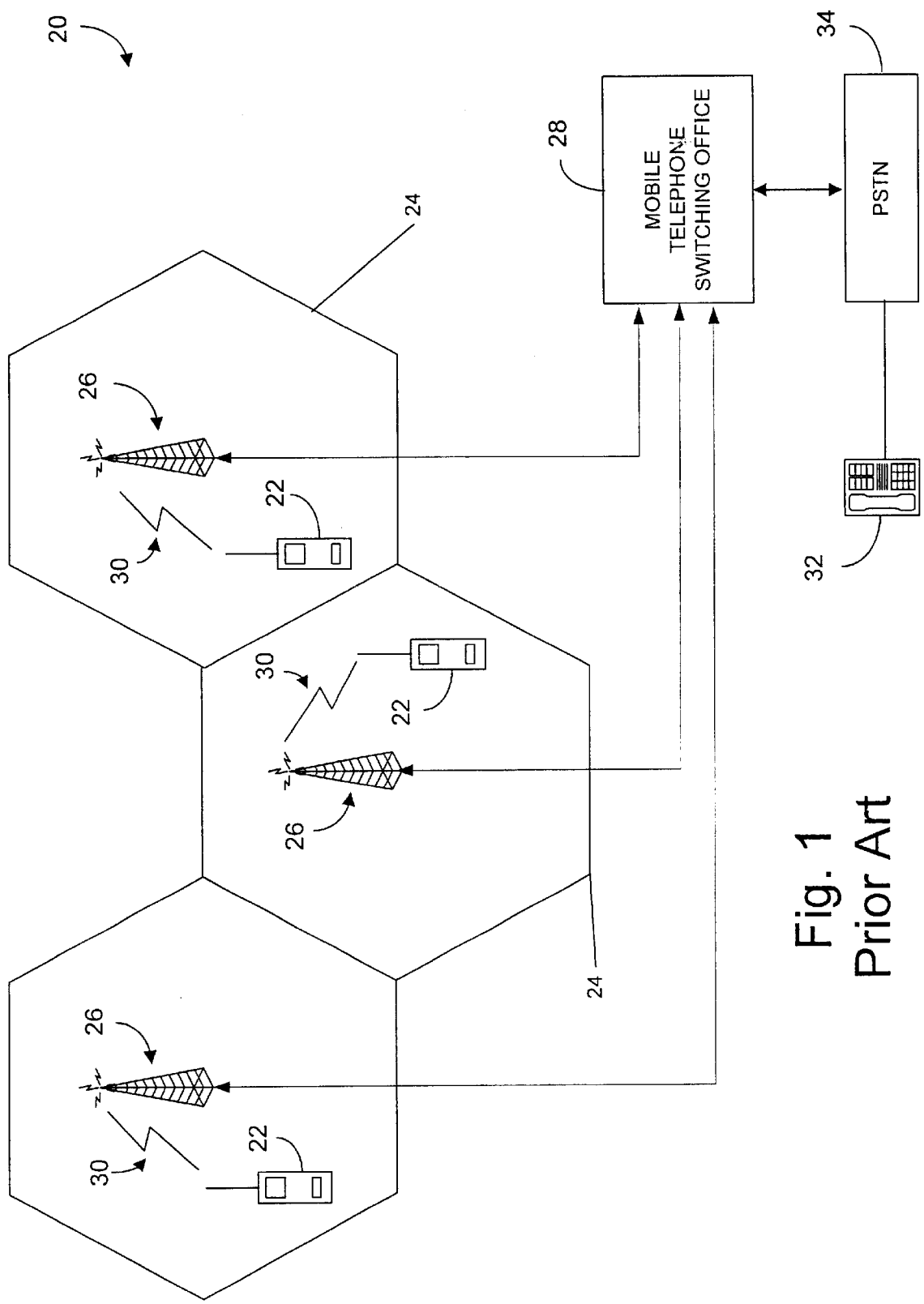
FIG. 1 is a schematic diagram illustrating a conventional terrestrial cellular communications system.
Figure 2:
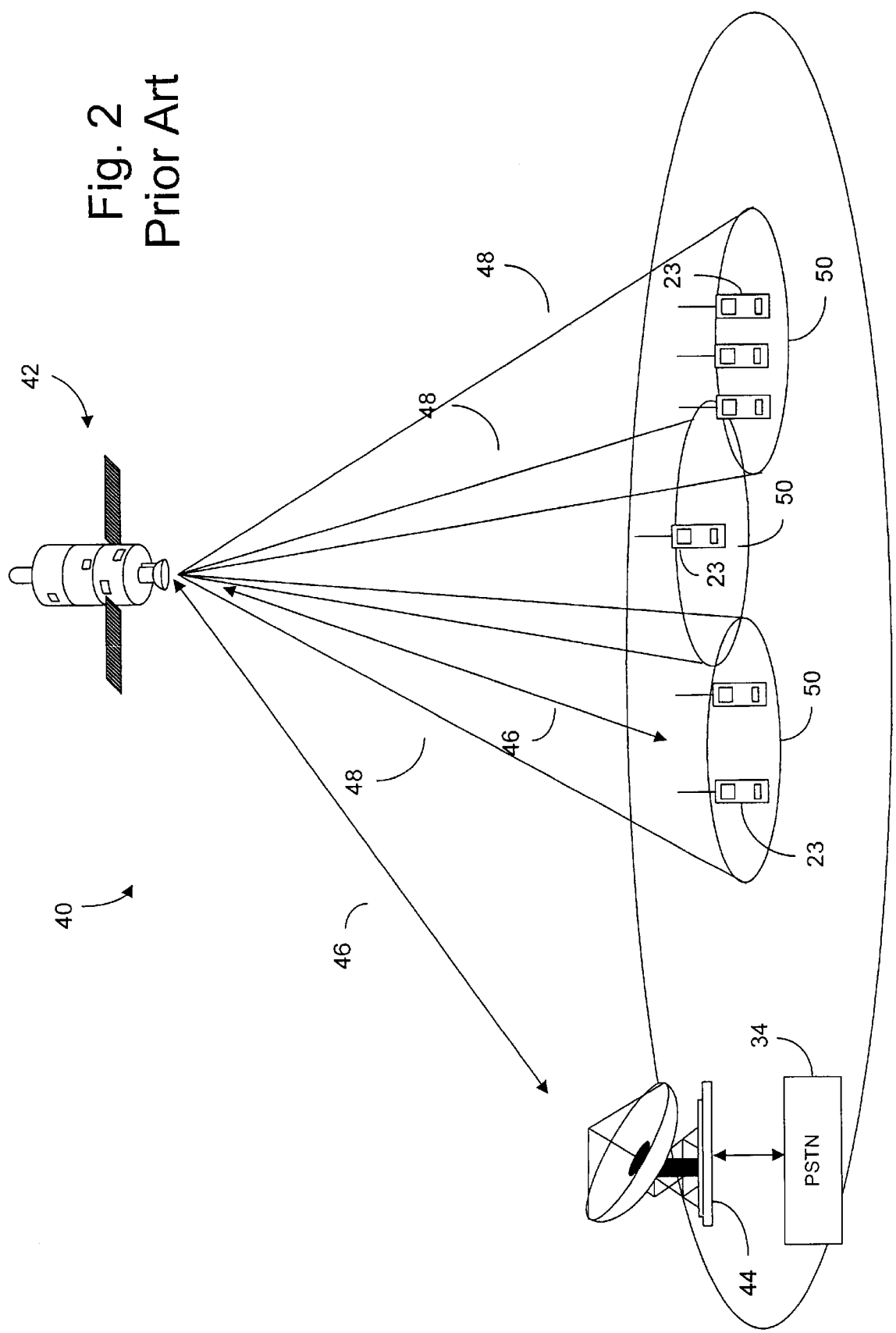
FIG. 2 is a schematic diagram illustrating a conventional satellite based wireless communications system.
Figure 3:
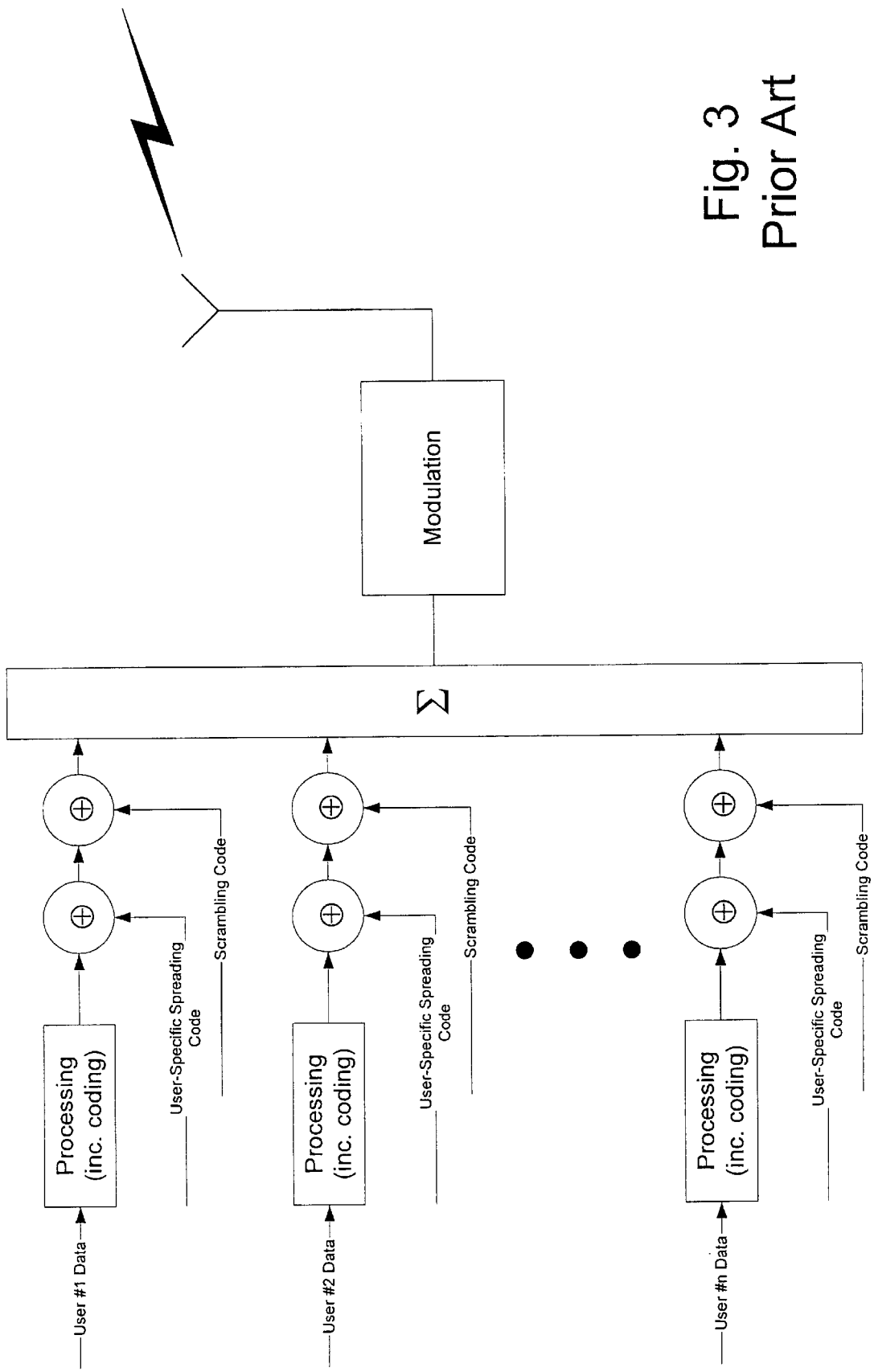
FIG. 3 is a schematic diagram illustrating a conventional wireless base station.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

The discussion herein relates to wireless communications systems, and more particularly, to wireless code division multiple access (CDMA) systems, for example, systems conforming to the IS-95 standards or to proposed standards for wideband CDMA (WCDMA, CDMA2000, and the like). In such wireless communications systems, an antenna radiates electromagnetic waveforms generated by a transmitter located, for example, in a mobile terminal or base station. The waveforms are propagated in a radio propagation environment, and are received by a receiver via one or more antennas. It will be understood that although the description herein refers to a radio environment, apparatus and methods are applicable to other environments, such as wireline communications and recovery of data from magnetic storage media.

The present invention arises from the realization that impairment (noise plus interference) properties of a composite signal may be explicitly determined based on knowledge of the spread spectrum signals in the composite signal, more particularly, based on statistical properties of the spreading sequences used to spread the signals. This impairment property estimate may be used to generate weighting factors for a combining process, such that the weighted combining removes interference and noise components. According to embodiments of the present invention, weighting factors are determined from a composite channel response and an impairment correlation matrix that reflect properties of the spread spectrum signals in the composite signal. According to another aspect, weighting factors are iteratively generated, obviating the need to invert the impairment correlation matrix.

Figure 4:
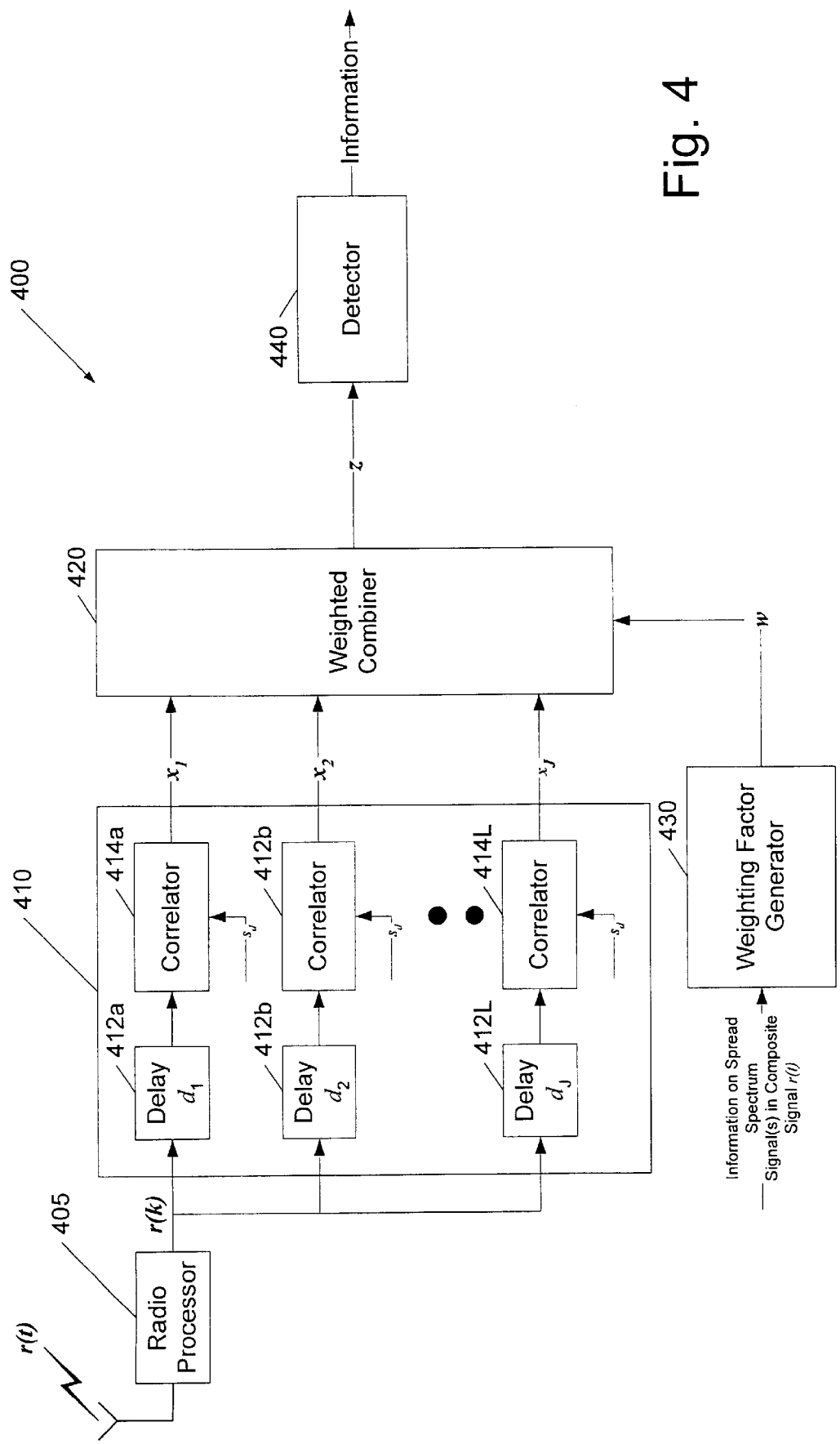
FIG. 4 is a schematic diagram illustrating a modified RAKE receiver according to an embodiment of the present invention.

FIG. 4 illustrates a modified RAKE receiver 400 according to an embodiment of the present invention, which recovers information represented by a spread spectrum signal transmitted according to a desired spreading sequence $s_d$ from a composite signal r(t) received from a communications medium. The receiver 400 includes means for receiving the composite signal r(t), e.g., a radio processor 405 that performs such operations as amplifying the signal r(t), mixing, filtering and producing baseband samples r(k) of the received signal r(t). A correlation unit 410, here shown as a bank of delays 412a–412L linked to a bank of correlators 414a–414L, correlates delayed versions of the baseband signal r(k) to the desired spreading sequence $s_d$. It will be appreciated that the radio processor 405 may perform a variety of other functions, and that the correlation unit 410 may be implemented in other forms, such as by using a sliding correlator.

The correlations $x_1, x_2, \ldots, x_j$ produced by the correlation unit 410 are combined in a weighted combiner 420 that uses weighting factors w generated by a weighting factor generator 430 based on knowledge of spread spectrum signals transmitted in the communications medium from which the composite signal r(t) is received. As will be shown in detail below, this may include information on the statistical properties of the desired spreading sequence $s_d$, as well as information about power of other spread spectrum signals included in the composite signal r(t). The weighted combiner 420 produces a decision statistic z that may then be used by a detector 440 to estimate information represented by the originally transmitted spread spectrum signal corresponding to the desired spreading sequence $s_d$ The detector 440 may, for example, employ soft decision decoding, such as convolutional or turbo decoding.

It will be appreciated that the receiver 400 of FIG. 4 may be implemented in a number of different ways. Although the description herein refers to employment of the receiver 400 in a mobile or other terminal that is operative to communicate with a base station of a wireless communications system, the receiver 400 can be implemented in a number of other forms including, but not limited to, receivers used in cellular base station transceivers, satellite transceivers, wireline transceivers, and other communications devices. The correlation unit 410, weighted combiner 420, weighting factor generator 430 and detector 440 may be implemented using, for example, an application-specific integrated circuit (ASIC), digital signal processor (DSP) chip or other processing device configured to perform the described processing functions. It will also be understood that, in general, these and other components of the receiver 400 may be implemented using special-purpose circuitry, software or firmware executing on special or general-purpose data processing devices, or combinations thereof.

The combining operations performed by the weighted combiner 420 may be expressed as:

$$z = w^H x, \text{ or} \quad (1)$$

$$z = Re\{w^H x\},$$

where z is the decision statistic produced by the combiner 420, w and x are vectors representing the weighting factors and the correlation outputs, respectively, and Re {} denotes the real part of the argument. The decision statistic can be used, for example, to determine a bit value (e.g., by using the sign of the decision statistic), or to provide soft values for subsequent decoding.

According to a preferred embodiment of the present invention, the weighting factors w generated by the weighting factor generator 430 are determined by first estimating a channel response and power of "own-cell" interfering spread spectrum signals (e.g., signals from the same base station) and noise. The channel response estimate and statistical properties of the desired spreading sequence $s_d$ are then used to determine a "composite" channel (impulse) response h, which reflects effects of the transmit pulse shape filter and/or other elements on the transmitting end, as well as the effects of the communications medium and the response of the receive filter. The channel estimate and the power estimates are used to determine an overall impairment correlation R that includes respective components attributable to own-cell interference, other-cell interference and thermal noise, to obtain an overall impairment correlation matrix R. The composite channel response h and the overall impairment correlation R are then used to compute the weighting factors w.

The weighting factors w are derived taking into account the statistical properties of the spreading sequences, and more particularly, may be explicitly calculated using information related to the spreading sequences and the transmitted spread spectrum signals with which they are associated. Weighting factors w can be intermittently calculated, for example, upon substantial changes in the delays 412a–412L and the channel estimates.

It can be shown that given a set of correlator delays ($d_1, d_2, \ldots, d_j$), where J is the number of correlators, the optimal combining weights to be used in the weighted combiner 420 may be expressed as:

$$w \underline{\Delta} (w_1, w_2, \ldots, w_j)^T = R^{-1} h, \quad (2)$$

where h is the composite channel response, including the transmit filter, medium, and receive filter responses, and R is the impairment correlation matrix.

It can be further shown that the composite channel response h is given by:

$$h_j = \frac{1}{N} \sum_{l=0}^{L-1} c_l \sum_{m=1-N}^{N-1} C(m) R_p(d_j + mT_c - \tau_l), \quad (3)$$

where $c_l$ and $\tau_l$ are related to the medium response $$c(t) = \sum_{l=0}^{L-1} c_l \delta(t - \tau_l),$$

L is the number of multipaths, N is the spreading factor, $T_c$ is the chip duration, $R_p(t)$ is the autocorrelation function of the chip waveform, and C(m) is the aperiodic autocorrelation function of the spreading sequence defined as:

$$C(m) = \begin{cases} \sum_{n=0}^{N-1-m} s(n)s*(n+m), & 0 \le m \le N-1 \\ \sum_{n=0}^{N-1+m} s(n-m)s*(n), & 1-N \le m < 0 \end{cases} \quad (4)$$

where s(n) is the nth chip of the spreading sequence.

As a potentially simpler alternative, $h_j$ may be estimated directly using a pilot channel, a pilot symbol, or decoded symbols.

The impairment correlation matrix R can be decomposed into three terms:

$$R = R_{ISI} + R_{MUI} + R_n, \quad (5)$$

where $R_{ISI}$, $R_{MUI}$, and $R_n$ are the correlation of the intersymbol interference, the correlation of multiuser (e.g., intracell) interference, and correlation of additive white noise, respectively.

These components of R can be computed by the following expressions:

$$R_{ISI}(d_1, d_2) = \frac{1}{N^2} \sum_{l=0}^{L-1} \sum_{q=0}^{L-1} \sum_{i=-\infty, i\neq 0}^{\infty} c_l c_q^* \sum_{m=1-N}^{N-1} (N - |m|) \times \\ R_p(d_1 + mT_c - iT - \tau_l) R_p^*(d_2 + mT_c - iT - \tau_q)$$ (6)

$$R_{MUI}(d_1, d_2) = \frac{\gamma_I}{N^2} \sum_{l=0}^{L-1} \sum_{q=0}^{L-1} \sum_{i=-\infty}^{\infty} c_l c_q^* \sum_{m=1-N}^{N-1} (N - |m|) \times \\ R_p(d_1 + mT_c - iT - \tau_l) R_p^*(d_2 + mT_c - iT - \tau_q)(1 - \alpha\delta(m)\delta(i))$$ (7)

and $$R_n(d_1, d_2) = \frac{\gamma_N}{N} \sum_{m=1-N}^{N-1} C(m) R_p(d_1 - d_2 + mT_c)$$ (8)

where $\gamma_I$ is the multiuser interference to signal power ratio, and $\gamma_n$ is the noise to signal power ratio. The variable $\alpha$ in (12) takes values on $\{1, 0\}$; if orthogonal spreading is used, $\alpha=1$, whereas if pseudo random spreading is used, $\alpha=0$. By considering various combinations (including combinations other than $d_1$, $d_2$), all elements of the impairment correlation matrix R can be obtained (the infinite summation in i can be truncated to include only significant terms, e.g., i=−1, 1). From the above equations, if the receiver has the knowledge of (1) the channel impulse response c(t), (2) the auto-correlation function of the chip waveform $R_p(t)$, (3) the interference to signal ratio ($y_I$), (4) the noise to signal ratio $y_n$, and (5) the aperiodic auto-correlation function of the spreading sequence C(m), the weighting factors w can be computed explicitly.

In many applications, multiuser interference is much stronger than inter-symbol interference. Accordingly, the impairment correlation R matrix can be approximated by:

$$R \approx R_{MUI} + R_n$$ (9)

In this case, these terms include a common scaling factor, a signal power S in the ratios $y_I$, $Y_N$. This term can be omitted, so that only the interference power I and noise power need be estimated. Alternatively, signal power can be estimated and used to estimate the ratios $y_I$, $y_N$.

Furthermore, in practice it may be cumbersome to calculate the aperiodic autocorrelation function C(m), as such a function typically varies from symbol to symbol. To reduce the complexity of weight calculation, an average aperiodic autocorrelation function $\overline{C}(m)$ can be used instead, as given by:

$$\overline{C}(m) = N\delta(m)$$ (10)

Using equations (9) and (10), equations (7) and (8) can be greatly simplified.

In handoff or transmit diversity scenarios, the interference as a result of multiuser signals from multiple base stations typically is colored in its own way by the channel response, and the multiuser interference component $R_{MUI}$ can be calculated by:

$$R_{MUI}(d_1, d_2) = \\ \sum_{k=1}^{K} \left\{ \begin{array}{c} \frac{\gamma_I^{(k)}}{N^2} \sum_{i=-\infty}^{\infty} \sum_{l=0}^{L-1} \sum_{q=0}^{L-1} c_l^{(k)}(c_q^{(k)})^* \sum_{m=1-N}^{N-1} (N - |m|) \times \\ R_p(d_1 + mT_c - iT - \tau_l^{(k)}) \\ R_p^*(d_2 + mT_c - iT - \tau_q^{(k)})(1 - \alpha_k \delta(m)\delta(i)) \end{array} \right\}$$ (11)

where superscript k is used for indexing base stations, and k=1 corresponds to the base station transmitting the desired spread spectrum signal. Typically, when orthogonal spreading is used, $\alpha_1=1$ while $\alpha_k=0$, for $k\neq 1$.

Figure 5:
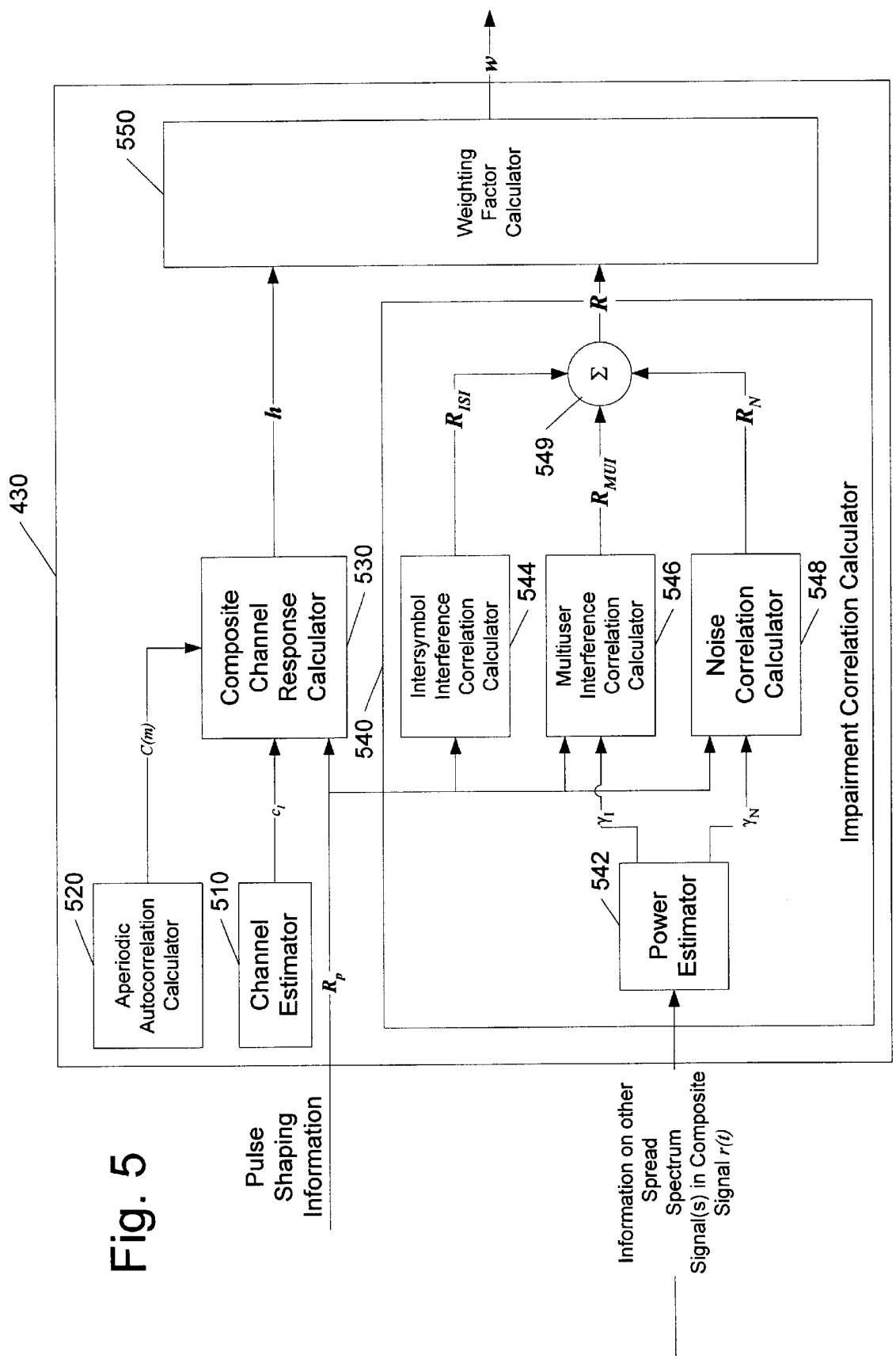
FIG. 5 is a schematic diagram illustrating a weighting factor generator according to an embodiment of the present invention.

FIG. 5 illustrates an exemplary weighting factor generator 430 according to an embodiment of the present invention. The weighting factor generator 430 includes a channel estimator 510 that estimates channel tap coefficients $c_l$, and an aperiodic autocorrelation calculator 520 that determines a value of the aperiodic autocorrelation function C(m). The channel tap coefficients c, and the value of the periodic autocorrelation function C(m) are supplied to a composite channel response calculator 530 that calculates the composite channel response h based on the statistical properties of the desired spreading sequence, i.e., the autocorrelation $R_p(t)$ of the chip pulse shape (waveform), using equation (3). As noted above, a composite channel response may be calculated directly from correlations corresponding to a pilot channel, a pilot symbol, or a decoded symbol.

The weighting factor determiner 430 also includes an impairment correlation calculator 540 that computes an impairment correlation R according to equation (5). The impairment correlation calculator 540 includes a power estimator 542 that supplies signal power ratios $\gamma_I, \gamma_N$ that are supplied to respective multiuser interference correlation and noise correlation calculators 546, 548 that compute multiuser interference correlation and noise correlation components $R_{MUI}$, $R_N$, respectively, according to equations (7) and (8). An intersymbol interference correlation calculator 544 calculates an intersymbol interference correlation component $R_{ISI}$. The intersymbol interference impairment correlation, multiuser interference correlation and noise correlation components $R_{MUI}$, $R_N$, $R_{ISI}$, are summed by a summer 549 to produce the impairment correlation R, which is used, along with the composite channel response h, to generate weighting factors w in a weighting factor calculator 550.

It will be understood that the apparatus illustrated in FIG. 5 may be modified along the lines suggested above. For example, the aperiodic autocorrelation calculator 520 may be eliminated, with the average aperiodic autocorrelation $\overline{C}(m)$ being substituted for the calculated aperiodic autocorrelation C(m), as described above in reference to equations (10), (8) and (3). The intersymbol interference impairment correlation calculator 544 may also be eliminated, along the lines described in reference to equation (9).

Figure 6:
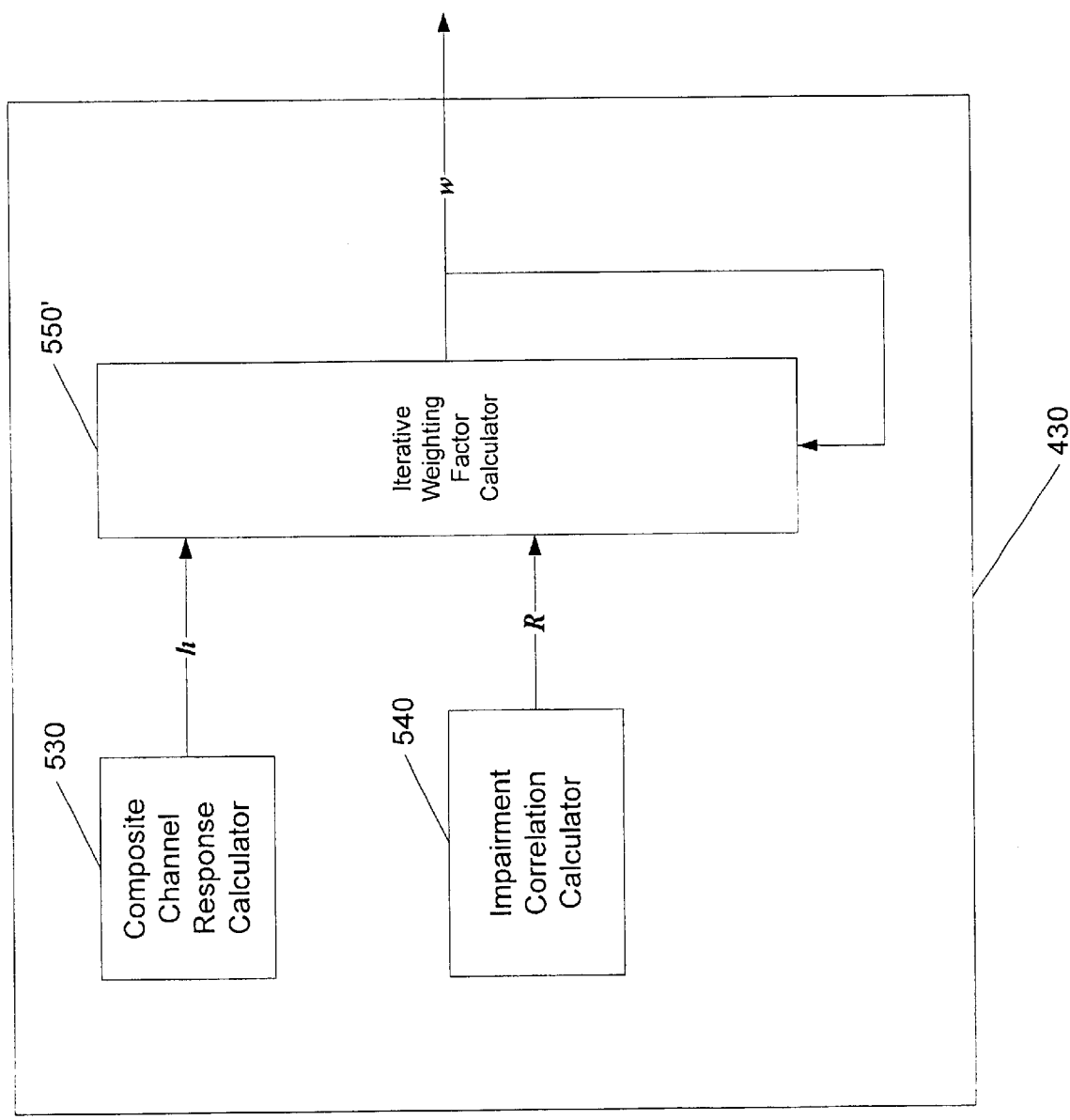
FIG. 6 is a schematic diagram illustrating a weighting factor generator according to another embodiment of the present invention.

Further simplification in determining weighting factors w can be achieved by using an iterative approach that obviates the need to compute the inverse $R^{-1}$ of the impairment correlation R to determine the weighting factors w. As illustrate in FIG. 6, the weighting factor generator 430 may include an iterative weighting factor calculator 550' that iteratively calculates weighting factors w from previously computed or otherwise provided weighting factors, using the composite channel response h and impairment correlation R provided by the composite channel response calculator 530 and the impairment correlation calculator 540, respectively.

Per equation (2), the weighting factors w, impairment correlation matrix R, and the composite channel response h form a linear system of the form:

$$Ax=b, \quad (12)$$

where A=R, x=w, and b=h. The impairment correlation matrix R can be computed according to the techniques described above. Alternatively, the impairment correlation matrix R can be determined using other techniques, such as the techniques described in U.S. patent application Ser. No. 09/165,647, by Bottomley, filed Oct. 2, 1998, assigned to the assignee of the present invention and incorporated by reference herein in its entirety.

As equation (12) describes a linear system, any of a number of techniques for solving linear systems may be used to find the weights. Preferably, an iterative technique that can compute new weighting factors from already existing weights without requiring matrix inversion is utilized. For example, an iterative Gauss-Seidel technique may be used, where weighting factors w are calculated by:

$$w_i(k+1) = \left(h_i - \sum_{j=1}^{i-1} r_{ij}w_j(k+1) - \sum_{j=i+1}^{n} r_{ij}w_j(k)\right)/r_{ii}, \quad (13)$$

where n is the dimension of the vectors w and h, $r_{ij}$ is the (i,j)th element of the impairment correlation matrix R, and k is the stage of iteration. If the initial guess (the values of w in the previous stage or previous symbol period) are close to the correct solution, this iteration should converge after only one or a few iterations. Initially the weighting factors w can be set to channel coefficient estimates, corresponding to traditional RAKE combining. Convergence can be accelerated by modifying the calculated $w_i(k+1)$ to:

$$w_i(k+1)=\lambda w_i(k+1)+(1-\lambda)w_i(k), \quad (14)$$

where $\lambda$ is a relaxation parameter. For $1<\lambda\leq 2$, faster convergence may be obtained for already convergent systems, and if normal iteration is not convergent, $\lambda\leq 1$ may be used to obtain convergence. These and other techniques for iterative solution of linear systems are described in *the Handbook of Mathematics and Computer Science*, by Harris et al., published by Springer-Verlag (New York, 1998), at pp. 456–457.

Referring again to FIG. 5, power estimator 542 estimates interference to signal and noise to signal ratios $\gamma_1, \gamma_N$, which are used in computing the weighting factors w. As the inter-symbol interference impairment correlation component $R_{ISI}$, can be neglected, as described above, it may suffice to determine a ratio $\gamma_1/\gamma_N$ of the interference to signal and noise to signal ratios to perform computation of the weighting factors w, setting $\gamma_N$ to some nominal number, such as 1 (equivalent to estimating a ratio of interference power to noise power).

In a wireless cellular communications system, a base station (BS) may inform a mobile or other terminal of power levels of all the spread spectrum signals being transmitted. The terminal may then simply compute its received power using conventional means, and use the base station information to determine the relative received power of the interference. Using these interference power estimates and an estimate of the total received power (which also may be obtained using conventional means), an estimate of the noise power (i.e., power of other interference and thermal noise) may then be obtained.

If a base station does not transmit power level information, however, it still may inform the terminal of which spreading codes are currently being used. Using such information, power information for the interfering signals can be determined using an apparatus such as the power estimator 542 illustrated in FIG. 7. A baseband signal r(k) corresponding to a received composite signal is passed through banks of delays 710a–710L, with each of the delayed versions of the baseband signal r(k) being descrambled by a descrambler 720a–720L and processed by a fast Walsh transformer 730a–730L. The resulting correlation information is then combined by a maximal ratio combiner 740 using channel estimates, the combined values indicating the energy in each code dimension. An interference power estimator 750 calculates the energy in dimensions spanned by the active codes (other than the desired code), and a noise power estimator 760 calculates energy in dimensions spanned by inactive codes.

Figure 7:
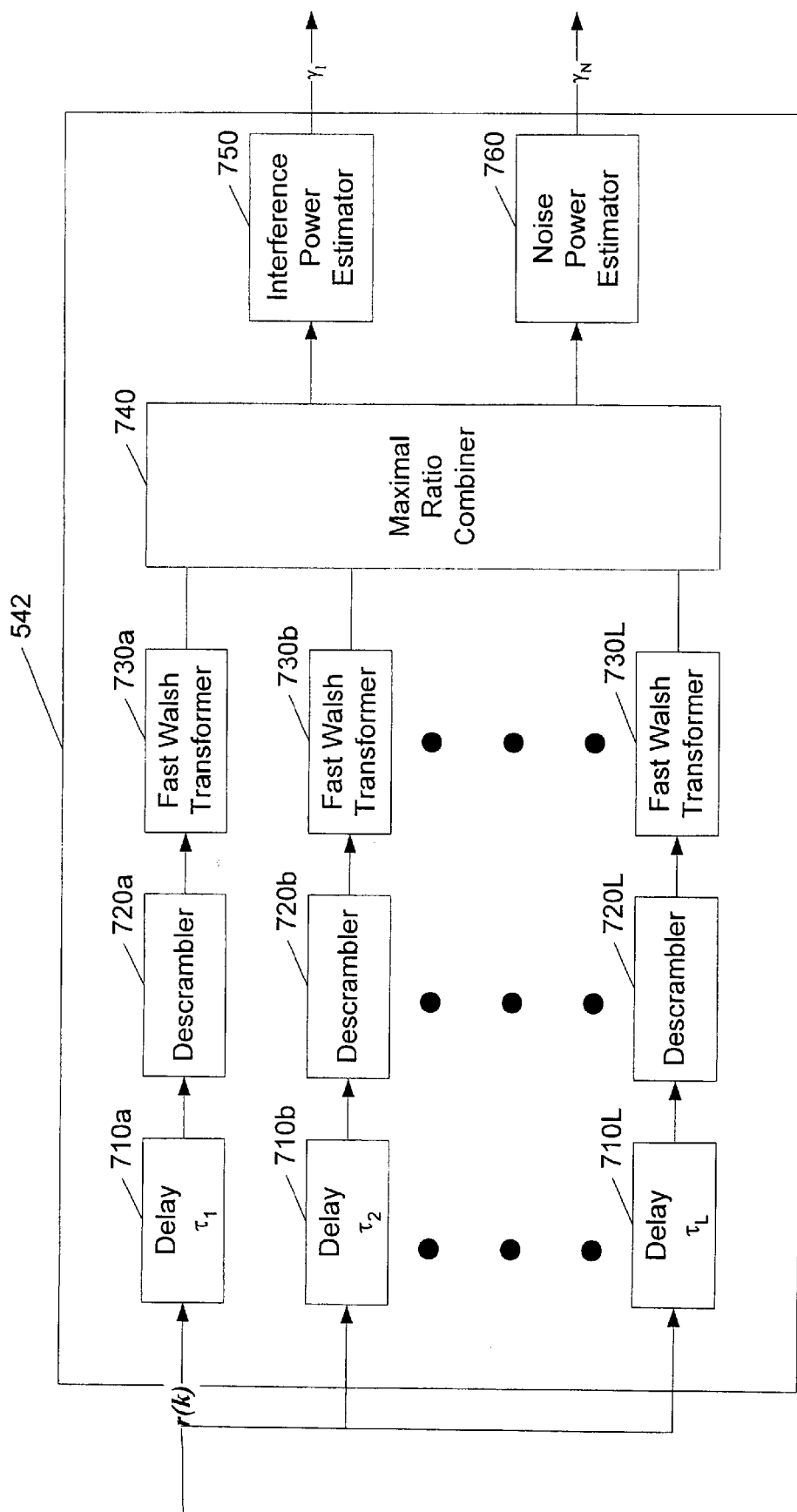
FIG. 7 is a schematic diagram illustrating an apparatus for detecting and/or determining power of interfering spread spectrum signals.

If the information on the active codes is not provided to the terminal, then the apparatus of FIG. 7 may be modified to detect which codes are active by, for example, thresholding the magnitude squared of the outputs of the maximal ratio combiner 740. Smoothing the magnitude squared of the output of the maximal ratio combiner for inactive codes can provide an estimate of the white noise power. There may be a slight bias from the interference and desired signal echoes, which can be removed. Smoothing the magnitude square of the output of the maximal ratio combiner 740 for the active codes, estimates of $I_i+N$ can be obtained, where $I_i$ is the interference power of the ith user and N is the white noise power. Using the estimate of N, estimates of $I_i$ can be obtained and summed to obtain an estimate of the overall interference power. Exemplary techniques for detecting spreading sequences and estimating power associated with particular spreading codes are described in U.S. patent application Ser. No. 09/235,470 to Wang et al., filed Jan. 22, 1999, assigned to the assignee of the present invention, and incorporated herein by reference in its entirety.

Referring again to FIG. 4, it is preferable that optimal finger locations (i.e., delay values) be used in the correlation unit 410 and weighting factor generator 430. Various delay optimization techniques and criteria may be used. A preferred optimization metric can be expressed as:

$$M=h^H w \text{ or} \quad (15)$$
$$M=h^H R^{-1} h,$$

wherein optimization is achieved by selecting delays that maximize M.

Figure 8:
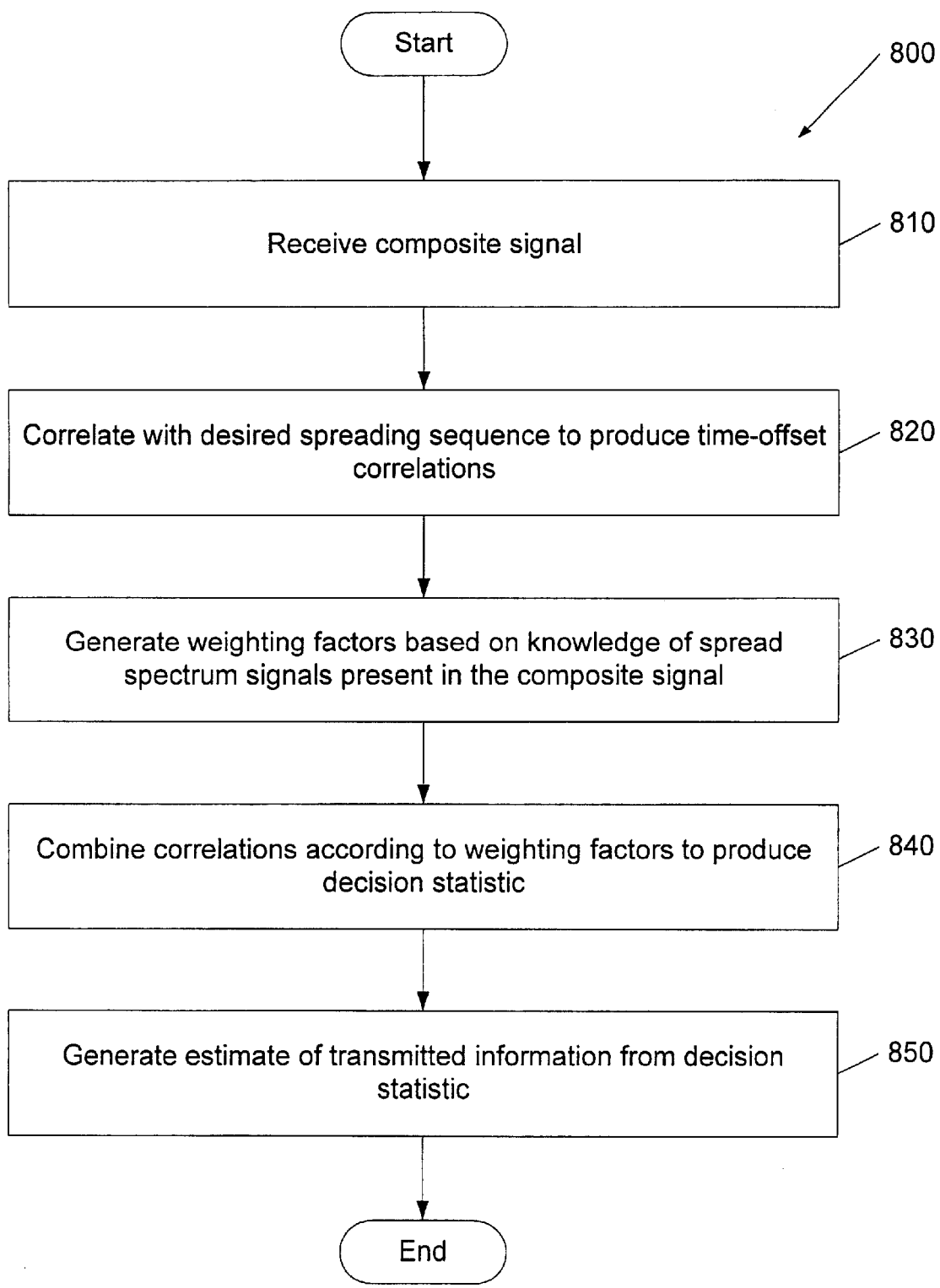
FIG. 8 is a flowchart illustrating exemplary operations for generating an estimate of information represented by a spread spectrum signal according to an aspect of the present invention.
Figure 9:
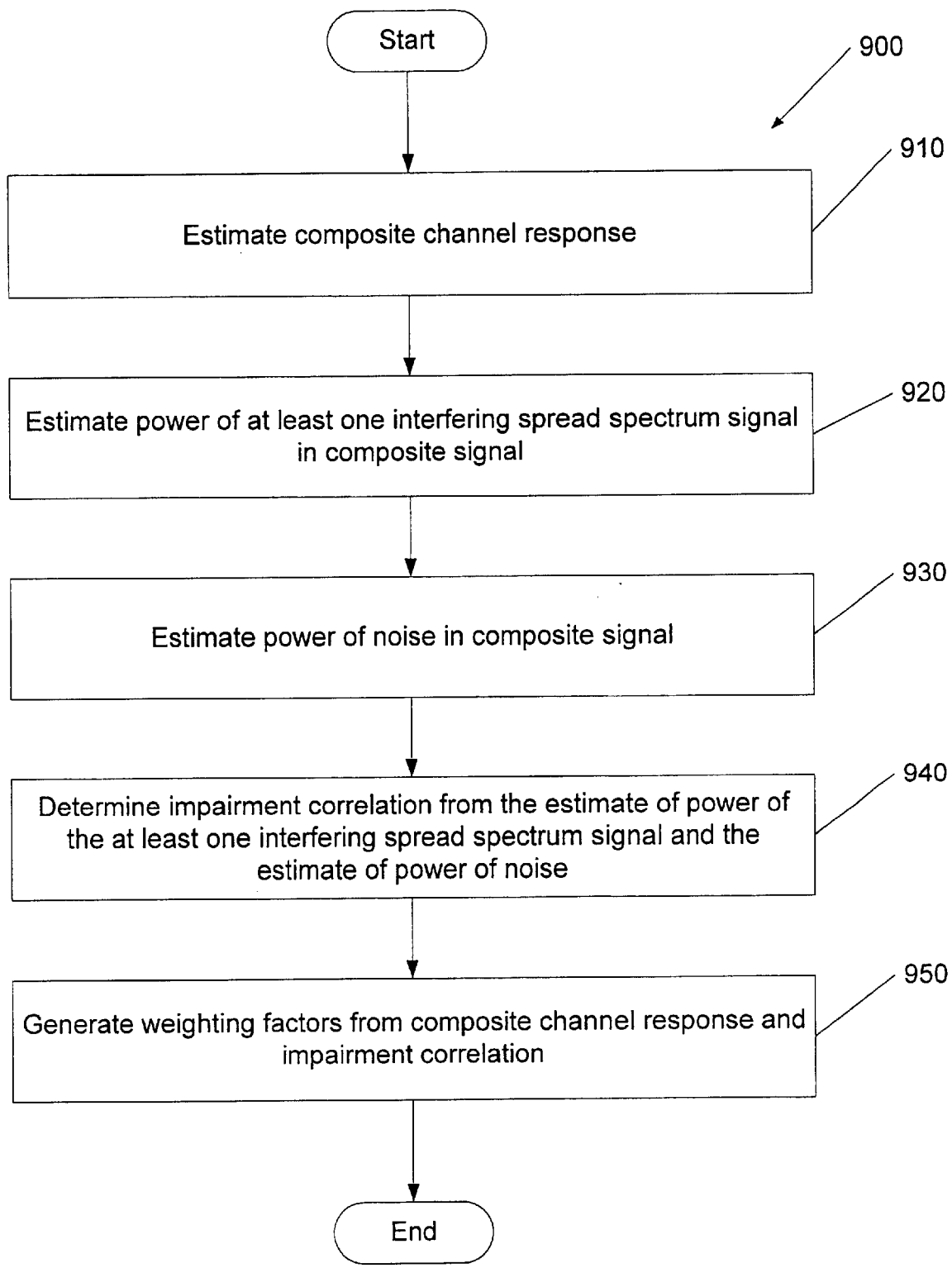
FIG. 9 is a flowchart illustrating exemplary operations for generating weighting factors for a RAKE receiver according to another aspect of the present invention.
Figure 10:
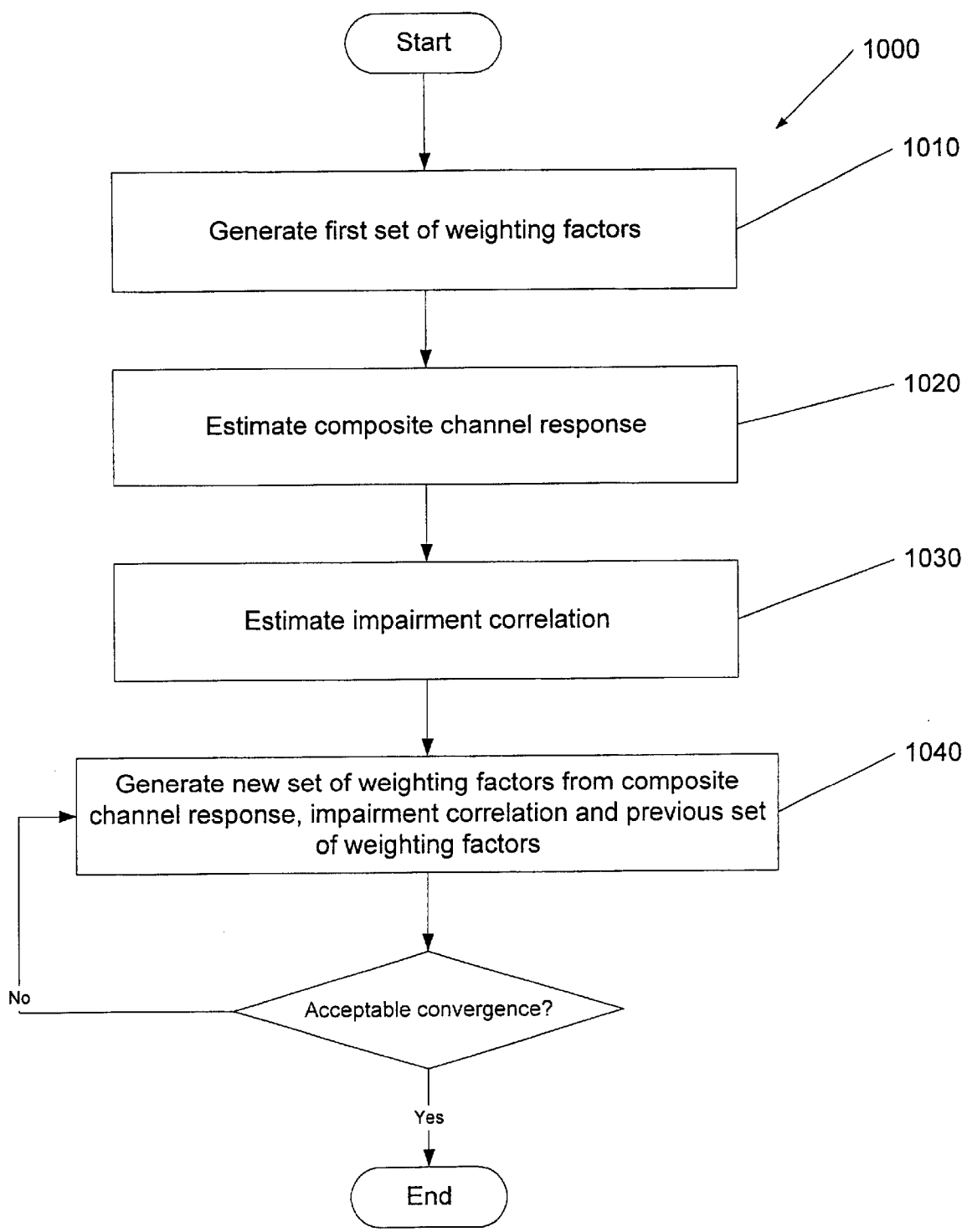
FIG. 10 is a flowchart illustrating exemplary operations for iteratively generating weighting factors for a RAKE receiver according to yet another aspect of the present invention.

FIGS. 8–10 are flowchart illustrations of exemplary operations according to various aspects of the present invention. It will be understood that blocks of these flowcharts, and combinations of blocks in these flowcharts, can be implemented by computer program instructions which may be loaded and executed on a computer or other programmable data processing apparatus, such as a microcomputer, microprocessor, ASIC, DSP chip or other processing circuitry used to implement the receiver 400 of FIG. 4, to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowcharts of FIGS. 8–10 support combinations of means for performing the specified functions and combinations of steps for performing the specified functions. It will also be understood that each block of the flowcharts of FIGS. 8–10, and combinations of blocks therein, can be implemented by special purpose hardware-based computer systems which perform the specified functions or steps, or combinations of special purpose hardware and computer instructions.

FIG. 8 illustrates exemplary operations 800 for recovering information represented by a spread spectrum signal transmitted according to a desired spreading code in a communications medium such as a radio propagation medium. A composite signal is received from the communications medium (Block 810), and correlated with the desired spreading sequence to produce time-offset correlations (Block 820). Weighting factors are generated based on knowledge of the spread signals present in the composite signal, e.g., based on statistical properties of the desired spreading sequence and power of interfering spread spectrum signals as described above with reference to equations (1)–(11) (Block 830). The correlations are combined according to the weighting factors to produce a decision statistic (Block 840), which is in turn used to generate an estimate of the originally transmitted information (Block 850).

FIG. 9 illustrates exemplary operations 900 for generating such weighting factors according to an aspect of the present invention. A composite channel response is estimated (Block 910). Powers of least one interfering spread spectrum signal and other noise are determined (Blocks 920, 930). An impairment correlation is then determined from the power estimates and knowledge of spread spectrum signals present in the composite signal, including pulse shape information represented by the autocorrelation function $R_p(t)$ (Block 940). The impairment correlation and channel response are used to generate the weighting factors (Block 950).

FIG. 10 illustrates exemplary operations 1000 for iteratively generating weighting factors according to yet another aspect of the present invention. A first set of weighting factors is generated using, for example, computations of equations (1)–(11), or by other techniques as described above (Block 1010). A composite channel response is estimated (Block 1020), along with an impairment correlation (Block 1030). New weighting factors are then iteratively generated from the previous set of weighting factors, the composite channel response and the impairment correlation until acceptable convergence is achieved (Block 1040).

Other variations of the operations described fall within the scope of the present invention. For example, channel estimation may also include automatic frequency correction (AFC). Feedforward AFC can be applied to each correlator associated with a signal echo, with the resulting phase estimate being used to form weighting factors by rotating channel estimates, as described in U.S. patent application Ser. No. 08/991,770, to Bottomley et al., filed Dec. 16, 1997, assigned to the assignee of the present invention and incorporated by reference herein in its entirety. Feedback correction of a voltage controlled oscillator could be based on a combination of the frequency error estimates. The present invention may also be used with multiple receive antennas. Correlators may be assigned to different antennas as well as to different delays, with the outputs of all correlators being collected together. The corresponding impairment correlation estimate and composite channel response estimate can be used to determine combining weighting factors, with the weighting factors including subsets corresponding to different antennas.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of recovering information encoded in a first spread spectrum signal transmitted according to a first spreading sequence in a communications medium, the method comprising the steps of:

receiving a composite signal including the first spread spectrum signal from the communications medium;

correlating the composite signal with the first spreading sequence to produce a plurality of time-offset correlations of the composite signal with the first spreading sequence;

generating weighting factors based on knowledge of spread spectrum signals present in the composite signal, including pulse shaping information; and combining the correlations according to the weighting factors to estimate information encoded in the transmitted first spread spectrum signal.

2. A method according to claim 1, wherein said step of generating weighting factors comprises the steps of:

receiving information about spread spectrum signals transmitted in the communications medium; and generating the weighting factors based on the received information.

3. A method according to claim 1, wherein said step of generating weighting factors comprises the steps of:

detecting spread spectrum signals in the composite signal;

determining characteristics of the detected spread spectrum signals; and generating the weighting factors based on the determined characteristic of the detected spread spectrum signals.

4. A method according to claim 1, wherein said step of generating weighting factors comprises the steps of:

estimating a composite channel response from knowledge of the first spreading sequence;

estimating an impairment correlation from knowledge of the first spreading sequence, an estimate of power of a second spread spectrum signal in the composite signal, and an estimate of power of noise in the composite signal; and generating the weighting factors from the estimated composite channel response and the estimated impairment correlation.

5. A method according to claim 4, further comprising the step of estimating power of the second spread spectrum signal.

6. A method according to claim 5, wherein said step of estimating power of the second spread spectrum signal comprises the steps of:

receiving information from a base station regarding power of the second spread spectrum signal; and estimating power of the second spread spectrum signal from the received information.

7. A method according to claim 5, wherein said step of estimating power of the second spread spectrum signal comprises the steps of:

identifying a second spreading sequence that encodes the second spread spectrum signal;

correlating the composite signal with the identified second spreading sequence to generate correlations; and determining power of the second spread spectrum signal from the correlations.

8. A method according to claim 7, wherein said step of identifying a second spreading sequence comprises the step of receiving information from a base station that identifies the second spreading sequence.

9. A method according to claim 7, wherein said step of identifying a second spreading sequence comprises the step of detecting the second spreading sequence from the composite signal.

10. A method according to claim 4:
wherein said step of estimating a composite channel response comprises the step of estimating the composite channel response from one of an aperiodic autocorrelation function for the first spreading sequence or an average aperiodic autocorrelation value for the first spreading sequence; and
wherein said step of estimating an impairment correlation comprises the step of estimating the impairment correlation from one of an aperiodic autocorrelation function for the first spreading sequence or an average aperiodic autocorrelation value for the first spreading sequence.

11. A method according to claim 4, wherein said step of estimating an impairment correlation comprises the steps of:
estimating an multiuser interference correlation;
estimating a noise correlation; and
summing the estimated multiuser interference correlation and the estimated noise correlation to estimate the impairment correlation.

12. A method according to claim 4 wherein said step of estimating an impairment correlation comprises the steps of:
estimating an multiuser interference correlation;
estimating a noise correlation;
estimating an intersymbol interference correlation; and
summing the estimated multiuser interference correlation the estimated noise correlation, and the estimated intersymbol interference correlation to estimate the impairment correlation.

13. A method according to claim 1, wherein said step of generating the weighting factors comprises the step of iteratively generating weighting factors from previously generated weighting factors.

14. A method according to claim 1, wherein said step of correlating comprises the step of correlating the composite signal with the first spreading sequence using a set of time delays that optimizes a metric that is proportional to a product of the weighting factors and the composite channel response.

15. A method of recovering information encoded in a first spread spectrum signal transmitted according to a first spreading sequence in a communications medium, the method comprising the steps of:
iteratively generating weighting factors from an estimated channel response, an estimated impairment correlation, and previously determined weighting factors;
receiving a composite signal including the first spread spectrum signal from the communications medium;
correlating the composite signal with the first spreading sequence to produce a plurality of time-offset correlations of the composite signal with the first spreading sequence; and
combining the correlations according to the iteratively generated weighting factors to estimate information encoded in the transmitted first spread spectrum signal.

16. A method according to claim 15, wherein said step of iteratively generating comprises the step of generating weighting factors from at least one of weighting factors determined for a previous iteration, weighting factors determined for a previous symbol period, or channel coefficients.

17. A method according to claim 15, further comprising the steps of:
generating the estimated channel response from knowledge of the first spreading sequence; and
generating the estimated impairment correlation from knowledge of the first spreading sequence, an estimate of power of a second spread spectrum signal in the composite signal, and an estimate of power of noise in the composite signal.

18. An apparatus for recovering information encoded in a first spread spectrum signal transmitted according to a first spreading sequence in a communications medium, the apparatus comprising:
means for receiving a composite signal including the first spread spectrum signal from the communications medium;
means, responsive to said means for receiving, for correlating the composite signal with the first spreading sequence to produce a plurality of time-offset correlations of the composite signal with the first spreading sequence;
means for generating weighting factors based on knowledge of spread spectrum signals in the composite signal, including pulse shaping information; and
means, responsive to said means for correlating and to said means for generating weighting factors, for combining the correlations according to the weighting factors to estimate information encoded in the transmitted first spread spectrum signal.

19. An apparatus according to claim 18, wherein said means for generating weighting factors comprises:
means for receiving information about spread spectrum signals transmitted in the communications medium; and
means for generating the weighting factors based on the received information.

20. An apparatus according to claim 18, wherein said means for generating weighting factors comprises:
means for detecting spread spectrum signals in the composite signal;
means for determining characteristics of the detected spread spectrum signals; and
means for generating the weighting factors based on the determined characteristic of the detected spread spectrum signals.

21. An apparatus according to claim 18, wherein said means for generating weighting factors comprises:
means for estimating a composite channel response from knowledge of the first spreading sequence;
means for estimating an impairment correlation from knowledge of the first spreading sequence, an estimate of power of a second spread spectrum signal in the composite signal, and an estimate of power of noise in the composite signal; and
means for generating the weighting factors from the estimated composite channel response and the estimated impairment correlation.

22. An apparatus according to claim 21, further comprising means for estimating power of the second spread spectrum signal.

23. An apparatus according to claim 22, wherein said means for estimating power of the second spread spectrum signal comprises:
   means for receiving information from a base station regarding power of the second spread spectrum signal; and
   means for estimating power of the second spread spectrum signal from the received information.

24. An apparatus according to claim 22, wherein said means for estimating power of the second spread spectrum signal comprises:
   means for identifying a second spreading sequence that encodes the second spread spectrum signal;
   means for correlating the composite signal with the identified second spreading sequence to generate correlations; and
   means for determining power of the second spread spectrum signal from the correlations.

25. An apparatus according to claim 24, wherein said means for identifying a second spreading sequence comprises means for receiving information from a base station that identifies the second spreading sequence.

26. An apparatus according to claim 24, wherein said means for identifying a second spreading sequence comprises means for detecting the second spreading sequence from the composite signal.

27. An apparatus according to claim 21, wherein said means for estimating an impairment correlation comprises:
   means for estimating a multiuser interference correlation;
   means for estimating a noise correlation; and
   means for summing the estimated multiuser interference correlation and the estimated noise correlation to estimate the impairment correlation.

28. An apparatus according to claim 21, wherein said means for estimating an impairment correlation comprises:
   means for estimating an multiuser interference correlation;
   means for estimating a noise correlation;
   means for estimating an intersymbol interference correlation; and
   means for summing the estimated multiuser interference correlation, the estimated noise correlation, and the estimated intersymbol interference correlation to estimate the impairment correlation.

29. An apparatus according to claim 18, wherein said means for generating the weighting factors comprises means for iteratively generating weighting factors from previously generated weighting factors.

30. An apparatus according to claim 18, wherein said means for correlating comprises means for correlating the composite signal with the first spreading sequence using a set of time delays that optimizes a metric that is proportional to a product of the weighting factors and the composite channel response.

31. An apparatus according to claim 18, wherein said means for correlating comprises at least one of a plurality of integrate and dump correlators, a sliding correlator, or a selectively inhibited sliding correlator.

32. An apparatus for recovering information encoded in a first spread spectrum signal transmitted according to a first spreading sequence in a communications medium, the apparatus comprising:
   means for iteratively generating weighting factors from an estimated channel response, an estimated impairment correlation, and previously determined weighting factors;
   means for receiving a composite signal including the first spread spectrum signal from the communications medium;
   means, responsive to said means for receiving, for correlating the composite signal with the first spreading sequence to produce a plurality of time-offset correlations of the composite signal with the first spreading sequence; and
   means, responsive to said means for iteratively generating weighting factors and to said means for correlating, for combining the correlations according to the iteratively generated weighting factors to estimate information encoded in the transmitted first spread spectrum signal.

33. An apparatus according to claim 32, wherein said means for iteratively generating weighting factors comprises means for generating weighting factors from at least one of a weighting factor determined in a previous iteration, a weighting factor determined for a previous symbol period, or a channel coefficient.

34. An apparatus according to claim 32, further comprising:
   means for generating the estimated channel response from knowledge of the first spreading sequence; and
   means for generating the estimated impairment correlation from knowledge of the first spreading sequence, an estimate of power of a second spread spectrum signal in the composite signal, and an estimate of power of noise in the composite signal.

35. An apparatus for recovering information encoded in a first spread spectrum signal transmitted according to a first spreading sequence in a communications medium from a composite signal received from the communications medium, the apparatus comprising:
   a correlation unit operative to correlate the composite signal with the first spreading sequence to produce a plurality of time-offset correlations of the composite signal with the first spreading sequence;
   a weighting factor generator operative to generate weighting factors based on knowledge of spread spectrum signals in the composite signal, including pulse shaping information;
   a weighted combiner responsive to said correlation unit and to said weighting factor generator and operative to combine the correlations according to the weighting factors to produce a decision statistic; and
   a detector responsive to said weighted combiner and operative to generate an estimate of information encoded in the transmitted first spread spectrum signal from the decision statistic.

36. An apparatus according to claim 35, further comprising means for receiving information about spread spectrum signals transmitted in the communications medium, and wherein said weighting factor generator is operative to generate the weighting factors based on the received information.

37. An apparatus according to claim 35, further comprising a spread spectrum signal detector operative to detect spread spectrum signals in the composite signal, and wherein said weighting factor generator is responsive to the spread spectrum signal detector to generate the weighting factors based on a characteristic of a detected spread spectrum signal.

38. An apparatus according to claim 35, wherein said weighting factor generator comprises:
   a composite channel response calculator operative to calculate a composite channel response from estimated channel coefficients and knowledge of the first spreading sequence;

an impairment correlation calculator operative to calculate an impairment correlation from estimated channel coefficients, knowledge of the first spreading sequence, an estimate of power of a second spread spectrum signal in the composite signal and an estimate of power of noise in the composite signal; and a weighting factor calculator responsive to said composite channel response calculator and to said impairment correlation calculator to calculate weighting factors from the calculated composite channel response and the calculated impairment correlation.

39. An apparatus according to claim 38, wherein said impairment correlation calculator comprises:

a power estimator operative to estimate power of the second spread spectrum signal in the composite signal and power of noise in the composite signal;

a multiuser interference correlation calculator operative to calculate a multiuser interference correlation from the estimated power of the second spread spectrum signal;

a noise correlation calculator operative to calculate a noise correlation from the estimated power of noise; and a summer operative to sum the multiuser interference correlation and the noise correlation to produce the impairment correlation.

40. An apparatus according to claim 38, wherein said impairment correlation calculator comprises:

a power estimator operative to estimate power of the second spread spectrum signal in the composite signal and power of noise in the composite signal;

a multiuser interference correlation calculator operative to calculate a multiuser interference correlation from the estimated power of the second spread spectrum signal;

a noise correlation calculator operative to calculate a noise correlation from the estimated power of noise;

an intersymbol interference correlation calculator operative to calculate an intersymbol interference correlation from the estimated channel coefficients; and a summer operative to sum the multiuser interference correlation, the noise correlation and the intersymbol interference correlation to produce the impairment correlation.

41. An apparatus according to claim 38:

wherein said composite channel response calculator is operative to calculate the composite channel response from one of an aperiodic autocorrelation function for the first spreading sequence or an average aperiodic autocorrelation value for the first spreading sequence.

42. An apparatus according to claim 35, wherein said correlation unit comprises at least one of a plurality of integrate and dump correlators, a sliding correlator, or a selectively inhibited correlator.

43. An apparatus for recovering information encoded in a first spread spectrum signal transmitted according to a first spreading sequence in a communications medium from a composite signal received from the communications medium, the apparatus comprising:

a weighting factor generator operative to iteratively generate weighting factors from an estimated channel response, an estimated impairment correlation, and previously determined weighting factors;

a correlation unit operative to correlate the composite signal with the first spreading sequence to produce a plurality of time-offset correlations of the composite signal with the first spreading sequence;

a weighted combiner responsive to said correlation unit and to said weighting factor generator to combine the correlations according to weighting factors produced by the weighting factor determiner to produce a decision statistic; and a detector responsive to said weighted combiner to generate an estimate of information encoded in the transmitted first spread spectrum signal from the decision statistic.

44. An apparatus according to claim 43, wherein the weighting factor generator is operative to generate weighting factors from at least one of a weighting factor determined in a previous iteration, a weighting factor determined for a previous symbol period, or a channel estimate.

45. An apparatus according to claim 43, further comprising:

a composite channel response estimator operative to estimate a composite channel response from estimated channel coefficients and knowledge of the first spreading sequence; and an impairment correlation estimator operative to estimate the impairment correlation from knowledge of the first spreading sequence, an estimate of power of a second spread spectrum signal in the composite signal and an estimate of power of noise in the composite signal; and wherein said weighting factor generator is responsive to said composite channel response estimator and to said impairment correlation estimator to generate weighting factors.

* * * * *

UNITED STATES PATENT AND TRADEMARK OFFICE
CERTIFICATE OF CORRECTION

PATENT NO. : 6,714,585 B1 Page 1 of 1
DATED : March 30, 2004
INVENTOR(S) : Wang et al.

It is certified that error appears in the above-identified patent and that said Letters Patent is hereby corrected as shown below:

<u>Title page,</u>
Item [56], References Cited, please delete the following references:

"FOREIGN PATENT DOCUMENTS
DE    3507841       3/1985    H04R/3/04
GB    2320404       6/1998    H04N/5/455

OTHER PUBLICATIONS
German Search Report dated Jun. 18, 1999."

Signed and Sealed this

Thirteenth Day of July, 2004

JON W. DUDAS
*Acting Director of the United States Patent and Trademark Office*